Figure 1:
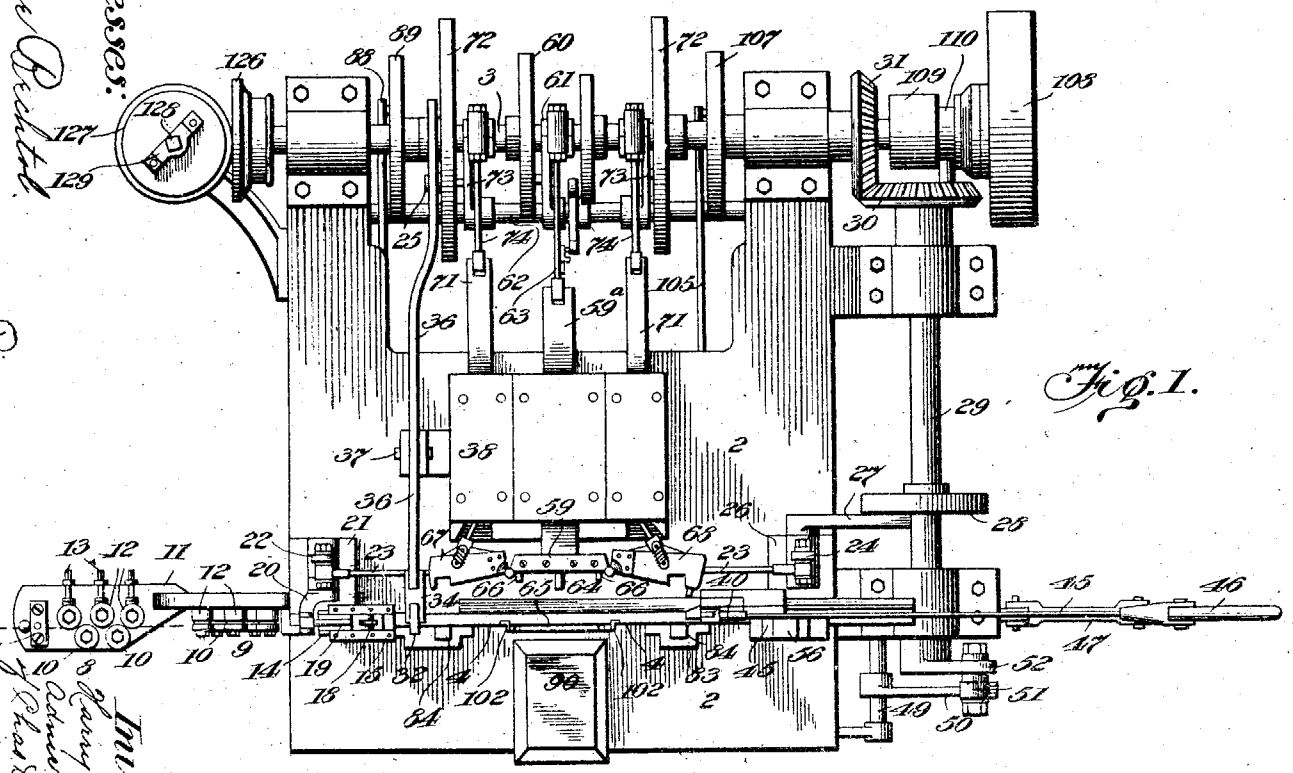

No. 12,835. REISSUED JULY 28, 1908.

C. D. GRIMES, DEC'D.

H. E. DILL, ADMINISTRATOR.

MACHINE FOR FORMING AND APPLYING WIRE BAILS TO PAPER BOXES.

APPLICATION FILED JUNE 3, 1908. 7 SHEETS—SHEET 1.

Witnesses:

Grace Brechtel.

H. W. Dreiliaison

Inventor:

Harry E. Dill.

Admr of estate of Chas. D. Grimes decd.

By J. Llewellyn Walker Atty

No. 12,835. REISSUED JULY 28, 1908.
C. D. GRIMES, DEC'D.
H. E. DILL, ADMINISTRATOR.
MACHINE FOR FORMING AND APPLYING WIRE BAILS TO PAPER BOXES.
APPLICATION FILED JUNE 3, 1908.
7 SHEETS—SHEET 2
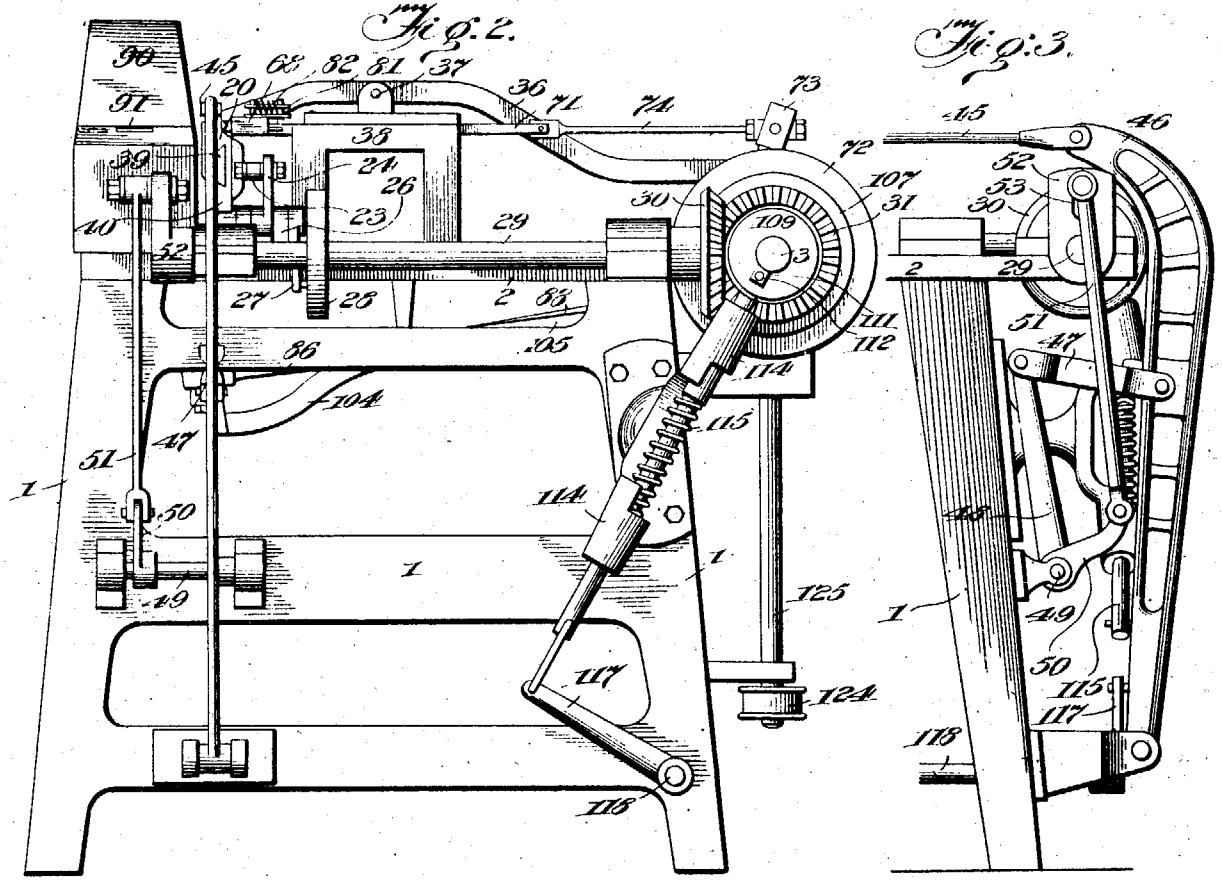
Witnesses:
Grace Brechtol
H. W. Dickinson
Inventor:
Harry E. Dill, Admr.
of estate of Chas. D. Grimes, decd.
By F. Llewellyn Walker Atty.

No. 12,835. REISSUED JULY 28, 1908.

C. D. GRIMES, DEC'D.

H. E. DILL, ADMINISTRATOR.

MACHINE FOR FORMING AND APPLYING WIRE BAILS TO PAPER BOXES

APPLICATION FILED JUNE 3, 1908.

7 SHEETS—SHEET 3.

Witnesses:
Grace Bechtol
H. W. Dickinson

Inventor:
Harry E. Dill Admr
By J. Llewellyn Walker Atty.
of estate of Chas. D. Grimes, decd.

No. 12,835. REISSUED JULY 28, 1908.

C. D. GRIMES, DEC'D.

H. E. DILL, ADMINISTRATOR.

MACHINE FOR FORMING AND APPLYING WIRE BAILS TO PAPER BOXES.

APPLICATION FILED JUNE 3, 1908. 7 SHEETS—SHEET 4.

Witnesses:

Grace Bechtol

H. W. Dieticson

Inventor:

Harry E. Dill Admr of estate of Chas. D. Grimes, deceased

By F. Llewellyn Walker

Atty

No. 12,835. REISSUED JULY 28, 1908.

C. D. GRIMES, DEC'D.

H. E. DILL, ADMINISTRATOR.

MACHINE FOR FORMING AND APPLYING WIRE BAILS TO PAPER BOXES.

APPLICATION FILED JUNE 3, 1908.

7 SHEETS—SHEET 5

Witnesses:

Grace Bechtol

H. W. Dickinson

Inventor:

Harry E. Dill, Admr of estate of Chas. D. Grimes, decd.

By J. Llewellyn Walker Atty

No. 12,835.

C. D. GRIMES, DEC'D. REISSUED JULY 28, 1908.

H. E. DILL, ADMINISTRATOR.

MACHINE FOR FORMING AND APPLYING WIRE BAILS TO PAPER BOXES.

APPLICATION FILED JUNE 3, 1908.

7 SHEETS—SHEET 6.

Witnesses.

Grace Bechtol

H. W. Dickinson

Inventor:

Harry E. Dill Admr

B. of estate of Chas. D. Grimes decd.

F. Llewellyn Walker

Atty

No. 12,835. REISSUED JULY 28, 1908.
C. D. GRIMES, DEC'D.
H. E. DILL, ADMINISTRATOR.
MACHINE FOR FORMING AND APPLYING WIRE BAILS TO PAPER BOXES.
APPLICATION FILED JUNE 3, 1908.
7 SHEETS—SHEET 7.
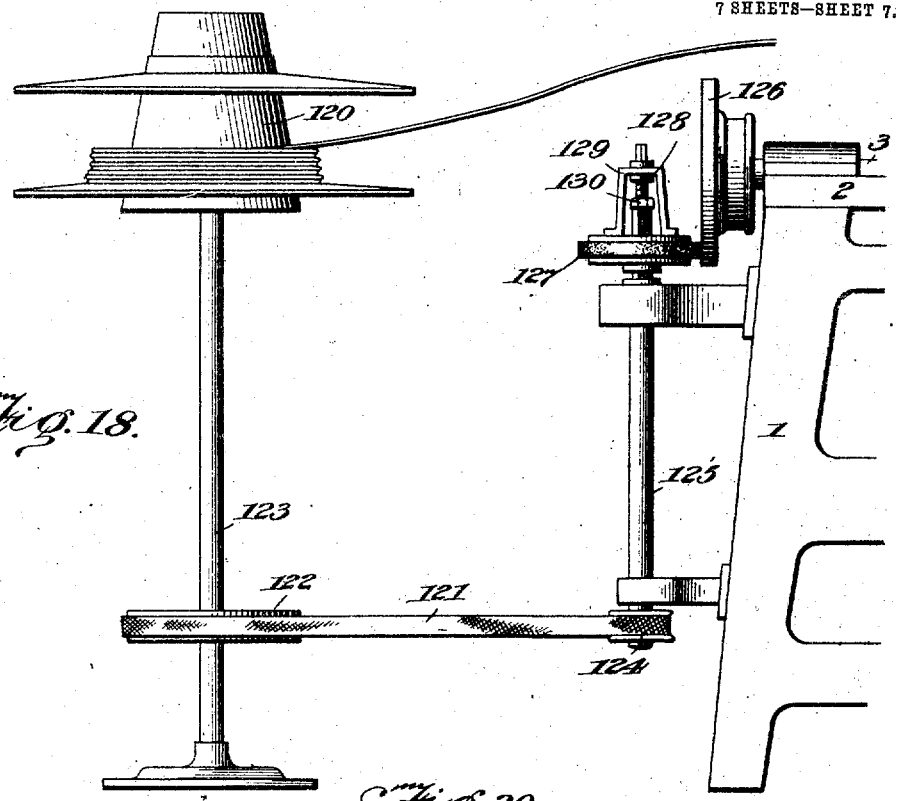
Fig. 18.
Fig. 20.
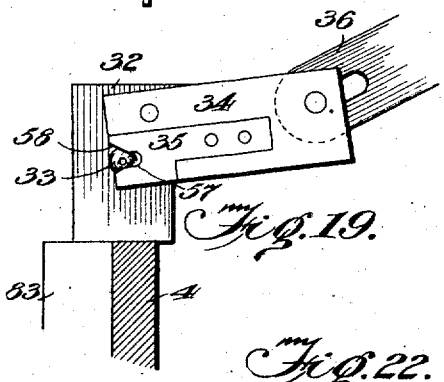
Fig. 19.
Fig. 21.
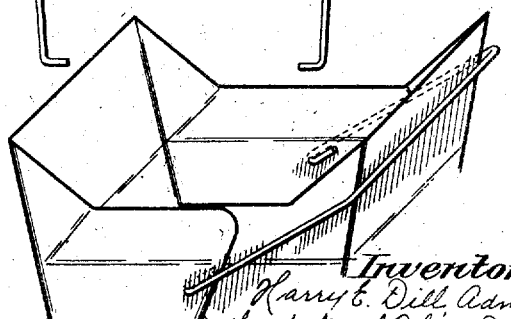
Fig. 22.
Witnesses:
Grace Bechtol
H. W. Dickinson
Inventor:
Harry E. Dill, Adm'r of estate of Chas. D. Grimes, dec'd.
By F. Llewellyn Walker Atty

UNITED STATES PATENT OFFICE.

HARRY E. DILL, OF DAYTON, OHIO, ADMINISTRATOR OF CHARLES D. GRIMES, DECEASED.

MACHINE FOR FORMING AND APPLYING WIRE BAILS TO PAPER BOXES.

No. 12,835. Specification of Reissued Letters Patent. Reissued July 28, 1908.

Original No. 872,176, dated November 26, 1907, Serial No. 350,538. Application for reissue filed June 3, 1908. Serial No. 436,532.

*To all whom it may concern:*

Be it known that CHARLES D. GRIMES, deceased, late a citizen of the United States, and resident of Dayton, in the county of Montgomery and State of Ohio, did invent certain new and useful Improvements in Machines for Forming and Applying Wire Bails to Paper Boxes, of which the following is a specification.

The invention relates to improvements in wire working machinery and particularly to machines for forming and applying wire bails to paper receptacles.

The object of the invention is to provide a machine which will be automatic in operation and to improve and simplify the construction as well as the means and mode of operation of such machines whereby they will not only be cheapened in construction, but are rendered more rapid and positive in operation and unlikely to get out of repair.

With the above primary and other incidental objects in view, as will appear from the specification, the invention consists of the means, mechanism, construction, and mode of operation or their equivalents hereinafter described and set forth in the claims.

Figure 4:
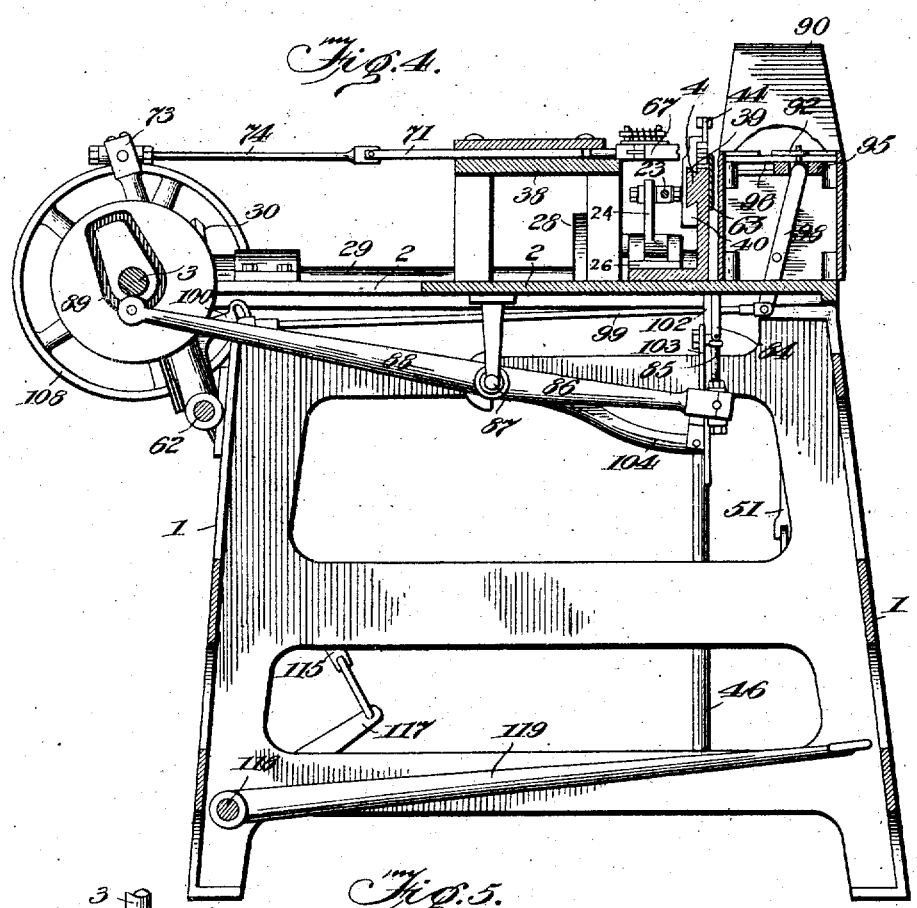
Figure 5:
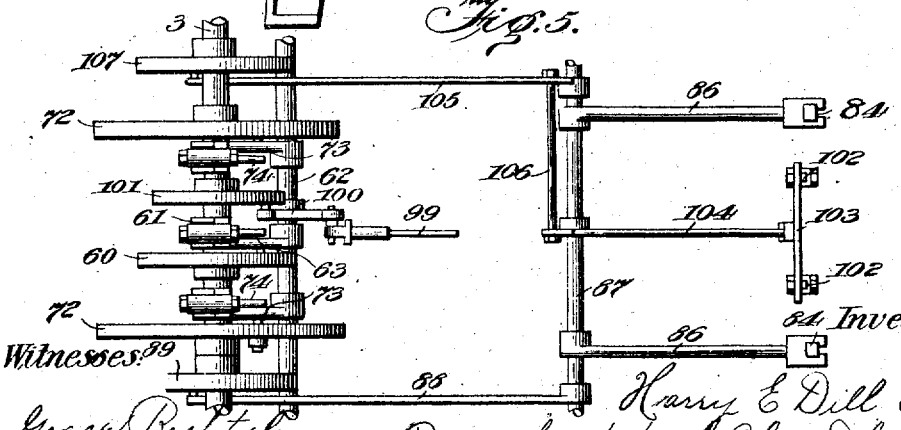
Figure 6:
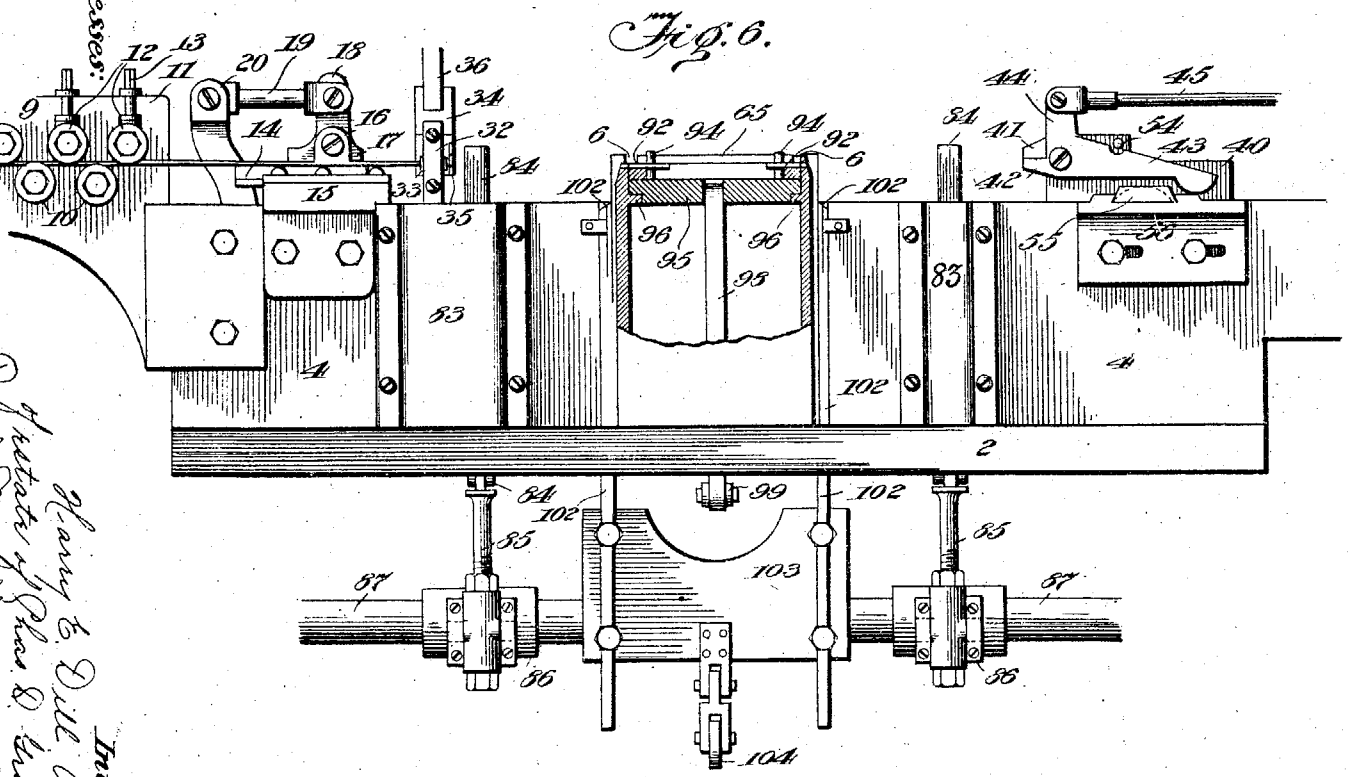
Figure 7:
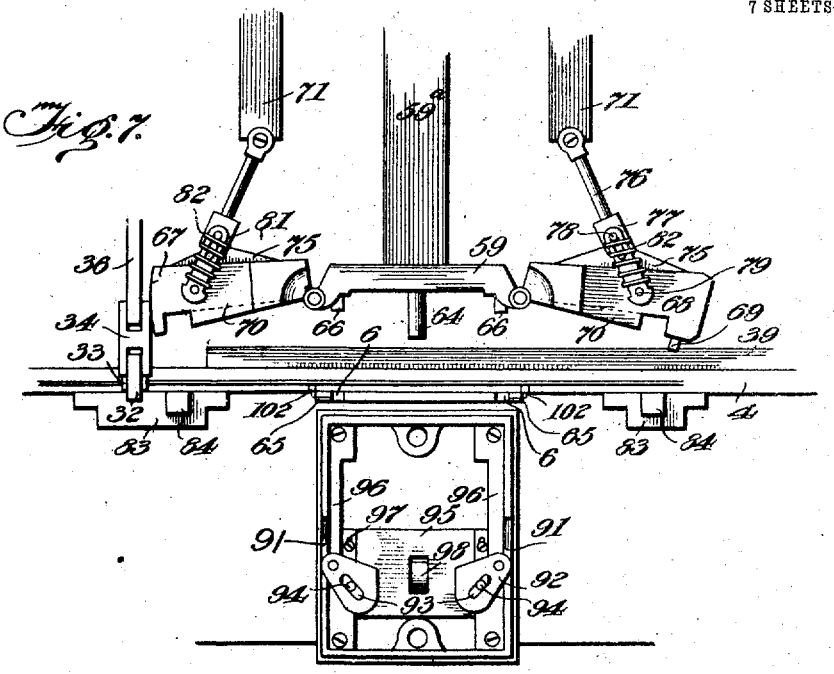
Figure 8:
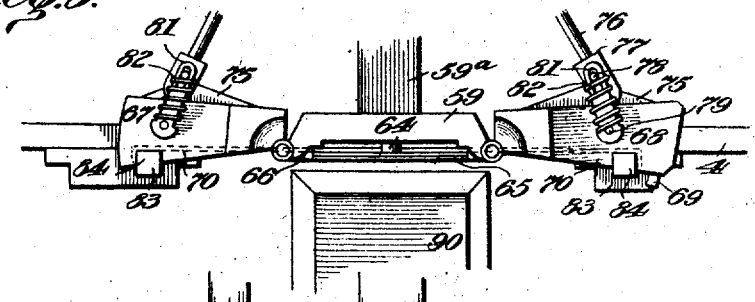
Figure 9:
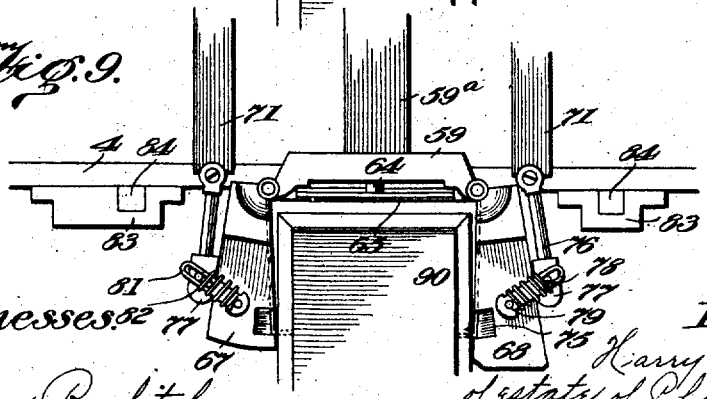
Figure 10:
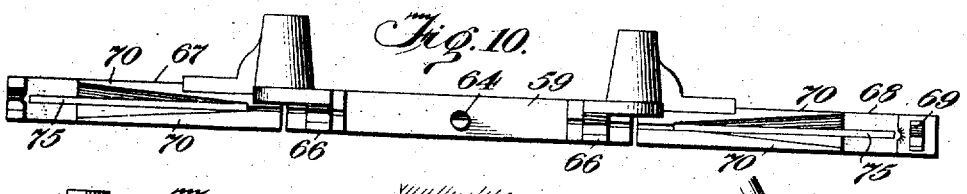
Figure 11:
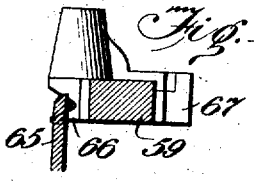
Figure 12:
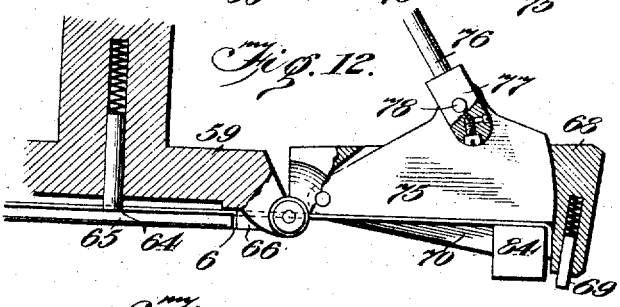
Figure 15:
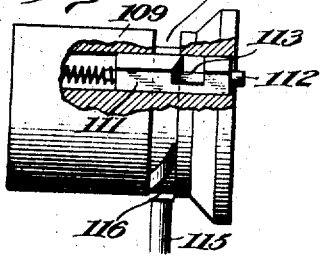
Figure 13:
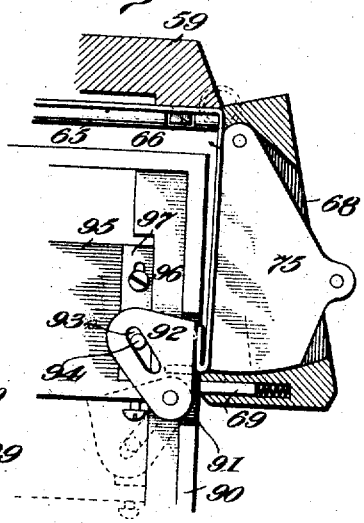
Figure 17:
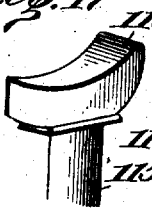
Figure 16:
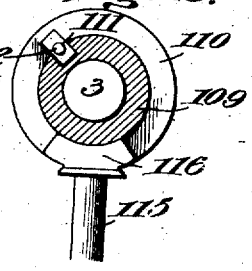
Figure 14:
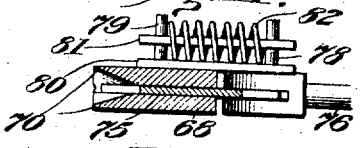

Referring to the drawing Figure 1 is a plan view of the assembled machine, Fig. 2 is a side elevation of the same, Fig. 3 is an elevation of a portion of the device as viewed from the left in Fig. 2. Fig. 4 is a vertical sectional view of the assembled machine, Fig. 5 is a plan view of the actuating cams and levers, Fig. 6 is a front elevation of a portion of the machine. Figs. 7, 8, and 9 illustrate the positions of the head and forming arms at the completion of the wire feeding, the first and the second bending operations respectively. Fig. 10 is a front view of the head and forming arms, Fig. 11 is a vertical sectional detail view of the head. Figs. 12 and 13 are horizontal sectional views of the head and one forming arm showing the position of the driver at the completion of the first and second bending operations. Fig. 13 illustrates the action of the clencher mechanism. Fig. 14 is a transverse sectional view of the former arm. Figs. 15, 16, and 17 illustrate the automatic disengaging clutch. Fig. 18 illustrates the means for intermittently operating the supply reel. Fig. 19 is a detail view of the severing device. Fig. 20 illustrates the section of wire after the first bending operation. Fig. 21 illustrates the same after the second bending operation. Fig. 22 is a perspective view of a portion of a paper bucket with the bail attached.

Like parts are indicated by similar characters of reference throughout the several views.

Referring by characters to the drawings, the operating devices are supported on a suitable frame comprising the legs 1 and the top 2. Supported on suitable bearing on the top 2 is the main drive shaft 3 carrying a series of actuating cams hereinafter mentioned. Extending transversely across the top 2 is a vertical flange 4 upon which is supported the wire feeding and other mechanism. The wire is conducted from the reel first through a wiper and oiler 5, which consists of an oil-saturated felt packing retained between upper and lower retaining plates. This device removes from the wire all grit and gives to the wire a smooth polished appearance. The wire thence passes between a plurality of pairs of straightening rolls. The straightening rolls are arranged in two series 8 and 9 in planes perpendicular to each other. The rolls 10 of each series are permanently located on the supporting bracket 11 while the rolls 12 are adjustable to and from the rolls 10 through adjusting screws 13.

All of the rolls of both series are arranged tangent to a commom line coincident with the path of travel of the wire. The respective rolls 10 and 12 are preferably staggered in their arrangement upon the bracket 11.

From the straightening rolls the wire passes to an auxiliary feeder and thence through the severing device. The auxiliary feeder consists of a reciprocating head 14 located in suitable ways 15. To suitable lugs 16 on said head 14 is pivoted a gripper jaw 17 extending fore and aft of its pivotal connection and having an upward extending arm 18 to which is connected a link 19 engaging a rock arm 20 mounted on a rock shaft located in suitable bearings in a bracket 21 attached to the top of the frame; on the same rock shaft is an upward extending arm 22 connected by a connecting rod 23 with a similar rock arm 24 located on a rock shaft in a similar bracket 26 at the opposite side of the top 2. Secured to the last mentioned rock shaft is an operating lever 27 engaging a suitable cam 28 on a counter shaft 29 driven by miter gears 30—31 from the driving shaft 3. (See Fig. 1.) The construction is such that upon the revolution of the cam 28 motion is transmitted through the cam lever 27, the respective rock arms 22—24 and connecting rod 23 to the rock arm 20, by which a limited reciprocating movement is given to the head 14. The engagement of the link 19 with the arm 18 being above the pivotal connection of the jaw 17 gives to said jaw a limited movement in either direction prior to the movement of the head 14. Upon the forward movement of the parts the jaw 17 is caused to grip or impinge the wire between the jaw and the head 14 and carry the wire forward with it. Upon the reverse movement the wire is released and the parts return independent of the wire. This auxiliary feeder serves to advance the wire a limited distance beyond the severing device in order that the end of the wire may be engaged by the principal feeding device.

The severing device consists of a stationary member 32 secured upon the supporting flange 4 having an opening therein through which the wire extends. The opening is preferably provided with a hardened steel bushing 33. Pivoted to the member 32 is a shearing block 34 carrying a shear blade 35 adjustable thereon, adjusted to pass in close proximity to the face of the bushing 33. The shear block 34 is operated by a lever 36 pivoted at 37 to a support 38 on the main frame. The lever 36 has a slotted connection with the shear block 34 and is adapted to be engaged by a pin or roller 25 on one of the actuating cams on the main shaft 3. Upon the upward oscillation of the rear end of the lever 36 by the pin 25 the shear block will be oscillated downward and the shear blade 35 will be thrust across the opening in the stationary member 32, thus severing the wire. This operation, however, does not occur until a length of wire sufficient to form a bail has been pulled through the severing device by the main feeding member, constructed as follows: Upon suitable ways 39 formed on the rear side of the flange 4 is slidingly mounted a head 40 having a fixed jaw 41. Pivoted to the head 40 is a corresponding movable jaw 42, having an extended tail portion 43 and an upward projecting arm 44. Connected to the arm 44 is a reciprocating rod 45 actuated by a lever 46 pivoted at its lower end to the frame of the machine. To oscillate the lever 46 a link 47 is provided connecting said lever with an arm 48 on a rock shaft 49. Mounted on the same shaft is a rock arm 50 connected by a link 51 with a crank 52 on the end of the countershaft 29, all of which parts are best shown in Figs. 2 and 3. For the purpose of adjusting the throw of the lever 46 the connection of the link 51 with the crank 25 is adjustable in a slot 53.

As the head 40 through the mechanism thus described is moved toward the severing devices, the initial movement of the parts moves the pivoted jaw 42 to open said gripper jaws, the movement of the jaw being limited by the engagement of the tail portion 43 with a pin 54 in the head 40. Upon further movement of the mechanism the head 40 is pushed into proximity to the severing devices. Upon the reverse movement of the parts the initial movement will cause the gripper jaws of the head 40 to engage the projecting end of the wire which has been previously advanced beyond the severing device by the action of the auxiliary feed devices as before described. Upon further reverse movement of the parts the gripper jaws will pull sufficient wire through the severing devices to form a bail. As the head 40 reaches the limit of its rearward stroke the tail portion 43 of the jaw 42 engages a cam block 55 on an adjustable bracket 56 secured to the flange 4, and by elevating the portion 43 releases the wire from the gripper jaws. After a sufficient length of wire has been drawn out, it is severed by the operation of the devices before described. It is to be noted that the cutting edge 57 of the shear blade 35 is at the vertex of a recess or notch 58, which serves to support the severed end of the bail section of wire. However, prior to the severing of the wire and the releasing of the same by the gripper jaws, the wire is engaged by suitable holding devices on a movable head 59 which is an integral part of a reciprocating member 59[a] slidingly mounted in suitable ways in the superframe or support 38 located on the main frame. The head 59 is given a reciprocatory movement by a cam 60 on the drive shaft 3. The cam 60 engages an arm 61 journaled on a shaft 62 which arm is connected at its upper end with the reciprocating member 59[a] which carries at its outer end the head 59, by a connecting rod 63. The head 59 is provided with a spring actuated depressible plunger 64 which engages the length of wire about the middle and presses it against a stationary plate or form 65 secured to and projecting above the flange 4. The engagement of the plunger 64 with the wire is prior to the limit of the stroke of the head 59. As the head 59 continues its movement the plunger 64 is depressed, and notched or bifurcated projections or bosses 66 on opposite sides of the plunger 64 engage the wire, by the respective parts of said notched projections extending on opposite sides of the wire and beyond the wire into suitable recesses 6 in the stationary form 65 as shown in detail, Fig. 11. By the V-shaped notches in the projections 66 the wire is accurately located in a predetermined position and is securely impinged between the said projections 66 and the stationary form 65. Hinged to the head 59 and extending in opposite directions are forming arms 67—68. These forming arms are identical in structure except that the arm 68 is provided with a notched depressible plunger 69, not provided on the arm 67 and which is adapted to engage the free end of the wire, which may bend out of alinement, and guide it to its proper location with regard to the arm. The forward or working surface of the respective arms is substantially L-shaped, provided throughout a portion of the length with beveled or inclined lips or flanges 70 adapted to guide the wire and center it on the forward face of the forming arm.

The arms are hinged to the head 59 by an offset joint as shown in Fig. 10 in order that the wire may extend in a straight unbroken line across the faces of the head 59 and the respective arms 67—68 and substantially through the center of movement of said arms as shown in Figs. 8, 10, 12, and others. The forming arms 67—68 are moved about their pivotal connections by reciprocating members 71 mounted in the superframe 38. The reciprocating members 71 are actuated by cams 72 engaging arms 73 on the shaft 62 which arms are connected by rods 74 with the members 71.

Pivoted in a suitable opening in each of the arms 67—68 and in a position to coincide with the wire when engaged by said arms is a driver member 75. This driver member is connected by a link 76 with the member 71. The link 76 has an eccentric head 77; that is to say, the distance from the pivotal connection of the link with the driver member to the forward end of the link is greater than that from the connection to the side of the head. Upward projecting pins 78—79 are provided in the arm and link respectively, upon which are engaged slotted links 80—81. (See Figs. 7, 8, 9, and 14). About the link 81 and intermediate the pins 78—79 is coiled a helical spring 82. The spring 82 tends to hold the arm and driver apart but permits in conjunction with the slotted links a movement of the driver 75 independent of the arm and against the tension of the spring 82. Upon the forward movement of the reciprocating members 71 the head 77 of the link 76 will engage the forming arm and positively move it about its hinged connection until the arm is moved from the path of link 76 when the link continuing in a path substantially parallel to the rear face of the arm will move the driver member about its pivotal connection independent of the forming arm. These features are best illustrated in Figs. 7, 8, and 9. Mounted in suitable ways 83 on the flange 4 are vertically movable forms or plungers 84 with which the L-shaped recesses of the forming arms register as the arms move forward. The engagement of the forming arms 67—68 with the forms 84 presses the wire within the recess and about the form 84 to bend the extremities of the wire at right angles to the main portion as shown in Figs. 8, 12, and 20. The wire upon engagement by the forming arms is guided to the proper horizontal plane by the recessed depressible plunger 69 and the inclined flanges 70. After the forming arms are pressed into registry with the forms 84 and the wire bent as described, the forms are withdrawn from the path of the forming arms and the forming arms are turned about their hinged connections to complete the formation of the bail.

To actuate the forms 84 that they may be moved into and out of the path of the forming arms, the lower ends of the forms are connected by links 85 with arms 86 secured on a rock shaft 87. Also secured on the shaft 87 is a rearward extending arm 88 engaged by a cam 89 on the drive shaft 3. The timing of the cam is such that at proper intervals it will cause the shaft 87 to oscillate and through the arms 86 the forms 84 will be raised and lowered. After the withdrawal of the forms 84 the forming arms 67—68 are turned about their hinged connections by a forward movement of the members 71 causing the wire to be bent at substantially right angles about the stationary form 65. The arms at the limit of their movement are brought into contact with a support 90 in the form of a truncated pyramid on which the paper receptacle suitably folded is held during the bailing process. As the forming arms 67—68 come to rest in contact with the support 90, the members 71 continuing the forward movement, move the drivers 75 about their pivotal connections as before described, to eject the bail from the engagement of the arms and project the inturned ends of the same through the sides of the receptacle located on the support 90 and through suitable recesses 91 in said support into the path of clenching devices within the support.

The clenching devices consist of plates 92 of proper shape pivoted to the support 90 having slotted openings 93 engaged by pins 94 projecting upward from a reciprocating member 95 mounted in suitable ways 96 in the support 90. The pins 94 are preferably attached to a separate piece 97 which is adjustably secured to the member 95 as shown in Figs. 7 and 13. When in normal position the plates 92 are located as in Fig. 7 and as in dotted lines in Fig. 13. The operation of the driving members 75 moves the bent end of the wire to the position shown in dotted lines in Fig. 13. Upon the movement of the member 95 the plates are moved about their pivots to the position shown by full lines, Fig. 13, bending the projecting end of the wire upon itself to parallelism. The member 95 is reciprocated by a lever 98 pivoted within the support 90, which engages a suitable opening in the member 95. The lower end of the lever 98 is connected by a rod 99 to an arm 100 on the shaft 62 which arm is actuated at suitable intervals by a cam 101 on the shaft 3. After the completion of the clenching operation the bail is ejected from about the form 65 by vertically moving fingers 102 adjustably secured to a plate 103 connected to an arm 104 journaled on the shaft 87. A rearward extending arm 105 is also journaled on the shaft 87 and is secured to the arm 104 by bolts 106 or otherwise whereby said arms will move in unison. The arm 105 is actuated at proper intervals by a cam 107 on the drive shaft 3. (See Fig. 5).

In order that the machine may not continue to feed wire and form bails when no receptacle is in place on the support 90, mechanism is provided for disengaging the drive wheel 108 at the completion of the operation. Secured upon the drive shaft 3 adjacent to the drive wheel 108 is a sleeve 109 having a peripheral groove 110. Mounted in said sleeve is a longitudinally movable spring pressed member 111 having a projecting finger 112 adapted to engage suitable recesses in the drive wheel 108. The spring pressed member 111 intersects the peripheral groove 110 and is provided with a cam way 113. Mounted in suitable guides 114 on the main frame is a spring pressed plunger 115 having a beveled head 116 (shown in detail Fig. 17) normally extending within the groove 110 and upon rotation of the sleeve 109 engages the cam way 113 of the member 111 and withdraws the finger 112 from the drive wheel 108.

The lower end of the plunger 115 is connected to a rock arm 117 on a rock shaft 118 journaled in the frame of the machine. A treadle lever 119 is provided by which at the will of the operator the head 116 of the plunger 115 may be withdrawn from the member 111 permitting the finger 112 to again engage the drive wheel 108 throughout one revolution.

The coil of supply wire is located on a reel 120 adjacent to the machine. The reel 120 is intermittently rotated by a belt 121 connecting a pulley 122 on the shaft 123 of the reel and a pulley 124 on a vertical counter shaft 125 mounted in suitable brackets on the frame of the machine. The counter shaft 125 is driven by a pair of friction gears 126—127 from the shaft 3. The gear 127 is splined on the shaft 125 and is adjusted thereon by a screw 128 engaging an arched member 129 secured to the gear 127 and screw threaded into the end of the shaft 125. A lock nut 130 holds the gear 127 in its adjusted position.

From the above description it will be apparent that there is provided a machine which will be rapid, accurate, and economical in its operation, and possessing other features of advantage which is obviously susceptible of modification in its form, proportion, detail construction, and arrangement of parts without departing from the principle involved or sacrificing any of its advantages.

Having thus described the invention, what is claimed is:—

1. In a machine as described, a reciprocating clamp to draw the wire across the machine, a series of reciprocating members and actuating devices therefor, wire holding and wire bending devices each separately actuated by one of said members, driving mechanism for driving the bent ends of the wire through the sides of a paper vessel, and means for clenching the ends of said wire, substantially as specified.

2. In a machine as described, the combination with three reciprocating members, of a supporting frame therefor, a shaft, cams thereon for actuating said members, a head upon the medial member adapted to engage and hold the wire to be operated upon, wire bending devices operated by the exterior members, a series of forms about which the wire is to be bent, means for depressing the exterior forms to permit the bending of the wire about the medial form, substantially as specified.

3. In a machine as described, wire feeding and wire severing devices, wire holding and wire bending devices, a series of members each coöperating with the others for actuating the respective wire holding and bending devices, a shaft, cams on said shaft, one for each member and connecting mechanism for operating said members, a block for holding the vessel to be bailed, driving and clenching mechanism to secure the bail when formed to the vessel, substantially as specified.

4. In a machine as described, wire feeding and wire severing devices, wire holding and wire bending devices, a series of reciprocating members each coöperating with the others for actuating the respective wire holding and bending devices, a shaft, cams thereon, one for each member, connecting mechanism for operating said members, a block for holding the vessel to be bailed, a pair of driving devices, cams and connecting devices for operating the same to drive the ends of the wire through the vessel, clenching devices, a cam, and connecting devices to operate the same to clench the ends of the bail in place.

5. In a machine as described, the combination with wire severing and bending mechanism, of a sliding head, a stationary gripper jaw and a movable gripper jaw on said head, a projecting arm on said movable jaw, a reciprocating rod connected to said arm, means for reciprocating said rod whereby the initial movement in either direction will operate said gripper jaws, and a further movement will move said sliding head, substantially as specified.

6. In a machine as described, the combination with wire severing and bending mechanism, of a sliding head, a stationary jaw and a pivoted jaw carried by said head, an arm on said pivoted jaw, a reciprocating rod connected to said arm adapted by its initial movement to move said pivoted jaw about its pivotal connection and upon further movement to reciprocate said sliding head, a portion of said pivoted jaw extending beyond its pivotal connection, and a cam engaging said extended portion to open said jaws as the sliding head approaches the limit of its stroke in one direction, substantially as specified.

7. In a machine as described, the combination with wire severing and bending mechanism, of means for advancing the supply end of the wire comprising a sliding head, a pivoted member mounted on said head, a reciprocating rod connected to said pivoted member and adapted when moved in one direction to give to said pivoted member an initial movement independent of said head whereby the wire to be fed will be impinged intermediate said head and pivoted member and when moved in the opposite direction will release said wire, substantially as specified.

8. In a machine as described, wire feeding, severing, and bending mechanism, wire holding mechanism comprising a stationary member, a movable member, a depressible plunger in said movable member, bifurcated projections on said movable member engaging the wire and projecting into suitable openings in the stationary member, substantially as specified.

9. In a machine as described, a movable head, extensions on said head having L-shaped recesses therein, forms with which said recesses register, means for feeding wire intermediate said forms and said head extensions, means for engaging said forms by said head extensions whereby the wire will be bent at right angles about said forms to conform to said L-shaped recesses, substantially as specified.

10. In a machine as described, a movable head, forming arms hinged to said head, a stationary form, means for feeding wire intermediate said head and form, independent plungers for moving said arms about their hinged connection independent of the movement of said head whereby the wire will be bent at substantially right angles about said form, substantially as specified.

11. In a machine as described, a movable head, forming arms hinged to said head, forms with which said arms engage, means for feeding wire intermediate said forms and forming arms, means for independently actuating said arms independent of the movement of said head to bend the wire about said forms, and means for disengaging the bent wire from said forms, substantially as specified.

12. In a machine as described, wire feeding, severing, and bending mechanism, a movable head, a stationary member with which said head coöperates, recessed projections on said head adapted to extend into recesses in said stationary member and retain the wire in the recesses of said projections, substantially as specified.

13. In a machine as described, wire feeding, severing, and bending mechanism, means for retaining the wire in a predetermined position comprising a movable head, a stationary member, a spring-pressed plunger in said head adapted to press the wire against said stationary member, substantially as specified.

14. In a machine as described, wire feeding, severing, and bending mechanism, means for maintaining the wire in a predetermined position comprising a movable head, a stationary member coöperating therewith, a spring-actuated plunger on said head adapted to impinge the wire against said stationary member prior to the limit of movement of said head, bifurcated projections on said head extending on opposite sides of the wire and engaging said stationary member, substantially as specified.

15. In a machine as described, wire feeding and severing mechanism, means for retaining the wire adjacent to a stationary form, hinged forming arms, means for causing said arms to engage said wire, means for independently moving said arms about their hinged connections to bend said wire about said form, substantially as specified.

16. In a machine as described, wire feeding and severing mechanism, a movable head adapted to retain the wire in a predetermined position, forming arms on said head, movable forms with which said arms engage, and means for withdrawing said forms from engagement with said arms, substantially as specified.

17. In a machine as described, wire feeding and severing mechanism, a movable head, movable forming arms carried thereby, forms with which said arms engage, means for withdrawing said forms from the path of said arms, and means for moving said arms through an arc of substantially ninety degrees, substantially as specified.

18. In a machine as described, wire feeding and severing mechanism, a movable head, forming arms pivoted thereto, forms with which said arms engage, inclined guiding flanges on said arms, substantially as specified.

19. In a machine as described, wire feeding and severing devices, movable forming arms, forms with which said arms coöperate, a depressible recessed plunger in one of said arms adapted to engage the wire and guide it to a predetermined position in relation to said arm, substantially as specified.

20. In a machine as described, wire feeding and severing devices, movable forming arms, forms with which said arms coöperate, driver members carried by said arms but capable of movement independent thereof, means for moving said drivers to eject the bent wire from engagement with said arms, substantially as specified.

21. In a machine as described, wire feeding and severing devices, a head, forming arms carried thereby, drivers pivoted to said forming arms, means for giving to said arms a predetermined movement, and means for giving to said drivers an additional movement independent of said arms, substantially as specified.

22. In a machine as described, wire feeding and severing devices, a head, forming arms carried thereby, a portion projecting forward of the working surface of said forming arm and forming therewith a right-angle recess, inclined flanges adjacent to the working surface of the arm adapted to guide the wire to a predetermined position thereon, and forms with which said arms coöperate, substantially as specified.

23. In a machine as described, wire feeding and severing devices, a head, forming arms pivoted thereto, forms with which said arms coöperate, a support for the receptacle to be bailed, means for moving said forming arms to a position adjacent to said receptacle, and means for ejecting the bent wire from said arms and projecting the ends thereof through the sides of said receptacle, substantially as specified.

24. In a machine as described, wire feeding, severing, and bending mechanism, a stationary support, clenching plates pivoted to said support, a movable member, engaging means between said movable member and clenching plates whereby the said plates will be moved about their pivotal connections, and means for projecting the ends of the bent wire into the paths of said plates, substantially as specified.

25. In a machine as described, wire feeding, severing, and bending devices, a support for the article to be bailed, clenching devices located within said support comprising pivoted clenching plates, a reciprocating member, pins in said member engaging slots in said clenching plates, means for reciprocating said member, and means for projecting the ends of the bail through the sides of the receptacle and into the paths of said clenching plates, substantially as specified.

26. In a machine as described, wire feeding and severing mechanism, hinged forming arms, a support for the article to be bailed, pivoted clenching plates, a driver pivoted to each of said forming arms, means for moving said forming arms into proximity of said support, means for actuating said drivers to force the ends of the bent wire through the sides of the article on said support and into the path of said clenching plates, means to move said plates about their pivots toward said drivers whereby the ends of the wire will be bent to parallelism, substantially as specified.

27. In a machine as described, wire feeding and severing mechanism, pivoted forming arms, a reciprocating member for actuating each of said forming arms, a member pivoted to said forming arm and connected by a link with said reciprocating member, an eccentric head on said link bearing on said forming arm and adapted to positively move said arm throughout a predetermined path of travel and to permit said link a further movement independent of said arm, substantially as specified.

28. In a machine as described, wire feeding and severing mechanism, wire bending mechanism comprising a head, forming arms carried thereby, forms with which said arms coöperate, an offset hinge connection for said arms whereby the wire when in adjusted position will extend substantially through the center of movement of said arms, means for projecting the ends of the wire through the sides of the receptacle, and means for clenching the projected ends, substantially as specified.

29. In a machine as described, the combination with wire feeding, severing, bending, and clenching mechanism, of a driving device, a clutch adapted to automatically disengage the driving mechanism at the completion of the operation, comprising a sleeve having therein a peripheral groove, a longitudinal spring-pressed member adapted to engage the drive device, intersecting said groove and having a cam-way therein, a cam member normally projecting into said groove and adapted to engage the cam-way and withdraw the longitudinal member from engagement with the drive device, and means for withdrawing said cam radially from said peripheral groove, substantially as specified.

In testimony whereof, I have hereunto set my hand this 29th day of May, 1908.

HARRY E. DILL,
*Administrator of the estate of Charles D. Grimes, dec'd.*

Witnesses:
THEO. C. LINDSEY, Sr
SOL. FLETCHER.